United States Patent
Tsuji et al.

(10) Patent No.: US 10,399,167 B2
(45) Date of Patent: *Sep. 3, 2019

(54) ELECTRIC DISCHARGE MACHINING ELECTRODE WIRE AND MANUFACTURING METHOD THEREFOR

(71) Applicant: Hitachi Metals, Ltd., Tokyo (JP)

(72) Inventors: Takayuki Tsuji, Kitaibaraki (JP); Hiromitsu Kuroda, Hitachi (JP); Tetsuya Tokumitsu, Hitachi (JP); Takamitsu Kimura, Hitachi (JP); Yosuke Shiba, Hitachi (JP); Hiroshi Matsuzaki, Hitachi (JP); Yuichi Komuro, Hitachi (JP); Shingo Amamiya, Hitachi (JP)

(73) Assignee: HITACHI METALS, LTD., Tokyo (JP)

( * ) Notice: Subject to any disclaimer, the term of this patent is extended or adjusted under 35 U.S.C. 154(b) by 99 days.

This patent is subject to a terminal disclaimer.

(21) Appl. No.: 15/122,081

(22) PCT Filed: Jan. 7, 2015

(86) PCT No.: PCT/JP2015/050277
§ 371 (c)(1),
(2) Date: Aug. 26, 2016

(87) PCT Pub. No.: WO2016/110964
PCT Pub. Date: Jul. 14, 2016

(65) Prior Publication Data
US 2017/0014927 A1    Jan. 19, 2017

(51) Int. Cl.
*B23H 1/06* (2006.01)
*B23H 7/08* (2006.01)
(Continued)

(52) U.S. Cl.
CPC ............. *B23H 7/08* (2013.01); *B23H 1/06* (2013.01); *B23K 35/0266* (2013.01);
(Continued)

(58) Field of Classification Search
CPC ... B23H 7/08; B23H 7/24; B23H 1/04; B23H 1/06; C22C 9/04; C22C 18/02; C22F 1/08;
(Continued)

(56) References Cited

U.S. PATENT DOCUMENTS 4,226,621 A    10/1980 Ruchel
5,762,726 A    6/1998 Barthel et al.
(Continued)

FOREIGN PATENT DOCUMENTS

CN    104191056 A    12/2014
JP    H 08-318434 A    12/1996
(Continued)

OTHER PUBLICATIONS

Korean Office Action dated Dec. 15, 2018 in Korean Application No. 10-2016-7023769 with an English translation thereof.
(Continued)

*Primary Examiner* — Christopher S Kim
(74) *Attorney, Agent, or Firm* — McGinn I.P. Law Group, PLLC

(57) ABSTRACT

An electrical discharge machining electrode wire includes a core including a copper or a copper alloy, and a covering layer that covers a periphery of the core and includes a zinc. The covering layer includes an outermost layer consisting of an ε-phase of a copper-zinc based alloy. The outermost layer has a Cu concentration of 12 to 20 mass % and a variation range within 5 mass % in the Cu concentration in a longitudinal direction of the electrode wire.

17 Claims, 3 Drawing Sheets

(51) Int. Cl.
| | |
|---|---|
| *C22C 9/04* | (2006.01) |
| *C22F 1/08* | (2006.01) |
| *C22F 1/16* | (2006.01) |
| *C25D 3/22* | (2006.01) |
| *C25D 5/50* | (2006.01) |
| *C25D 7/06* | (2006.01) |
| *H01B 1/02* | (2006.01) |
| *B23K 35/02* | (2006.01) |
| *B23K 35/30* | (2006.01) |
| *B23K 35/40* | (2006.01) |
| *C22C 18/00* | (2006.01) |
| *C22C 18/02* | (2006.01) |
| *H01B 19/04* | (2006.01) |

(52) U.S. Cl.
CPC .......... *B23K 35/302* (2013.01); *B23K 35/404* (2013.01); *C22C 9/04* (2013.01); *C22F 1/08* (2013.01); *C22F 1/165* (2013.01); *C25D 3/22* (2013.01); *C25D 5/50* (2013.01); *C25D 7/0607* (2013.01); *H01B 1/026* (2013.01); *H01B 19/04* (2013.01); *C22C 18/00* (2013.01); *C22C 18/02* (2013.01)

(58) Field of Classification Search
CPC .. C22F 1/165; C25D 3/22; C25D 5/50; C25D 7/0607
USPC ............................................. 219/69.12, 69.15
See application file for complete search history.

(56) References Cited

U.S. PATENT DOCUMENTS

| | | | |
|---|---|---|---|
| 6,447,930 | B2 | 9/2002 | Barthel et al. |
| 7,687,738 | B2 | 3/2010 | Ly |
| 7,723,635 | B2 * | 5/2010 | Shin .................. B23H 7/08 219/69.11 |
| 8,067,689 | B2 | 11/2011 | Tomalin |
| RE44,789 | E | 3/2014 | Barthel et al. |
| 2009/0025959 | A1 | 1/2009 | Tomalin |
| 2016/0368070 | A1 | 12/2016 | Liang et al. |
| 2017/0259361 | A1 | 9/2017 | Tsuji |

FOREIGN PATENT DOCUMENTS

| | | |
|---|---|---|
| JP | 2002-126950 A | 5/2002 |
| JP | 2004-160655 A | 6/2004 |
| JP | 3549663 B2 | 8/2004 |
| JP | 2008-296298 A | 12/2008 |
| KR | 10-2016-0091376 A | 8/2016 |

OTHER PUBLICATIONS

Notification of Transmittal of Translation of the International Preliminary Report on Patentability (PCT/IB/338) in PCT Application No. PCT/JP2015/050277 dated Jul. 20, 2017 (and English translation of Written Opinion).

Extended European Search Report dated Sep. 7, 2017 in counterpart European Patent Application No. 15876842.4-1362.

International Search Report (ISR) (PCT Form PCT/ISA/210), in PCT/JP2015/050277, dated Apr. 14, 2015.

United States Office Action dated Jun. 7, 2018 in U.S. Co-pending U.S. Appl. No. 15/122,112.

United States Office Action dated Oct. 17, 2018 in U.S. Appl. No. 15/122,112.

United States Office Action dated Mar. 1, 2019 in U.S. Appl. No. 15/122,112.

United States Notice of Allowance dated Apr. 15, 2019 in U.S. Appl. No. 15/122,112.

\* cited by examiner

ELECTRIC DISCHARGE MACHINING ELECTRODE WIRE AND MANUFACTURING METHOD THEREFOR

TECHNICAL FIELD

The present invention relates to an electrical discharge machining electrode wire and a method of manufacturing the same.

BACKGROUND ART

Electrical discharge machining electrode wires having a zinc coating around a core formed of copper or a copper alloy (see, e.g., PTLs 1 to 4) are advantageous in that surface finish of a processed portion of a workpiece is better than when using electrical discharge machining electrode wires provided with only a core formed of copper or a copper alloy.

CITATION LIST

Patent Literature

[PTL 1]
JP-A-2002-126950
[PTL 2]
JP-A-2008-296298
[PTL 3]
JP-B-3549663
[PTL 4]
U.S. Pat. No. 8,067,689

SUMMARY OF INVENTION

Technical Problem

In case of electrical discharge machining electrode wires having the outermost surface layer formed of pure zinc, the outermost surfaces are soft and wear debris is therefore likely to be produced during electrical discharge machining. To address this problem, copper is dispersed in the surface layer by performing heat treatment before and after wire drawing so as to have the outermost surface layer formed of a zinc-copper alloy, thereby reducing formation of wear debris.

However, when such heat treatment is performed on a coiled electrode wire wound around a bobbin, etc., heat is likely to stay on in a portion located on the inner side of the bobbin and the electrode wire is therefore unevenly heat-treated in the longitudinal direction. This causes the uneven Cu concentration in the outermost surface layer, leading to a problem that electrical discharge machining characteristics of the electrode wire are not consistent in the longitudinal direction thereof.

Thus, it is an object of the invention to provide an electrical discharge machining electrode wire that has a zinc covering at a periphery of a core and that controls a variation in Cu concentration in an outermost surface layer, as well as a method of manufacturing the electrical discharge machining electrode wire.

Solution to Problem

To achieve the above-mentioned object, the invention provides an electrical discharge machining electrode wire and a method of manufacturing the same described below.

[1] An electrical discharge machining electrode wire comprising: a core comprising a copper or a copper alloy; and a covering layer that covers a periphery of the core and comprises a zinc, wherein the covering layer comprises an outermost layer consisting of an ε-phase of a copper-zinc based alloy, and the outermost layer has a Cu concentration of 12 to 20 mass % and a variation range within 5 mass % in the Cu concentration in a longitudinal direction of the electrode wire.

[2] The electrical discharge machining electrode wire defined by [1], wherein the covering layer further comprises an inner layer including a γ-phase of a copper-zinc based alloy.

[3] The electrical discharge machining electrode wire defined by [2], wherein an x-ray diffraction intensity of (0001) of the ε-phase in the covering layer is more than twice an x-ray diffraction intensity of (332) of the γ-phase in the covering layer.

[4] The electrical discharge machining electrode wire defined by any one of [1] to [3], wherein the core comprises a brass.

[5] A method of manufacturing an electrical discharge machining electrode wire, wherein the electrode wire comprises a core comprising a copper or a copper alloy and a covering layer that covers a periphery of the core and comprises a zinc, the method comprising:
plating once the periphery of the core with a zinc or a zinc alloy;
drawing the plated core; and
after the drawing, conducting a heat treatment under such heat treatment conditions that the covering layer comprises an outermost layer consisting of an ε-phase of a copper-zinc based alloy and the outermost layer has a Cu concentration of 12 to 20 mass % and a variation range within 5 mass % in the Cu concentration in a longitudinal direction of the electrode wire.

[6] The method of manufacturing an electrical discharge machining electrode wire defined by [5], wherein the heat treatment conditions are a heat treatment temperature of 100 to 120° C. and a heat treatment time in a range of 3 to 24 hours.

Advantageous Effects of Invention

According to the invention, an electrical discharge machining electrode wire can be provided that has a zinc covering at a periphery of a core and that controls a variation in Cu concentration in an outermost surface layer, as well as a method of manufacturing the electrical discharge machining electrode wire.

DESCRIPTION OF EMBODIMENT

[Electrical Discharge Machining Electrode Wire]

Figure 1:
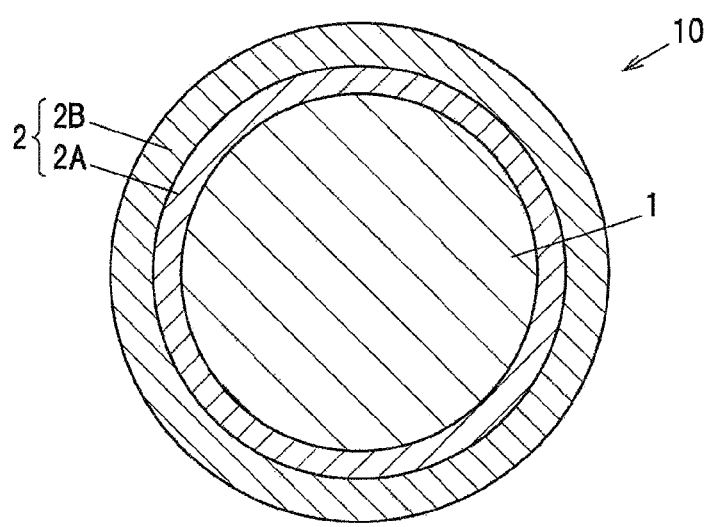
FIG. 1 is a cross sectional view showing a structure of an electrical discharge machining electrode wire in an embodiment of the present invention.

FIG. 1 is a cross sectional view showing a structure of an electrical discharge machining electrode wire in an embodiment of the invention.

An electrical discharge machining electrode wire 10 in the embodiment of the invention shown in FIG. 1 is provided with a core 1 formed of copper or a copper alloy and a zinc-containing covering layer 2 covering the periphery thereof, and is characterized in that the covering layer 2 has an outermost layer 2B consisting of only an ε-phase copper-zinc alloy, and the outermost layer 2B has a Cu concentration of 12 to 20 mass % such that the Cu concentration in a longitudinal direction of the electrode wire has a variation range within 5 mass %. The outermost layer 2B constituting the covering layer 2 is a surface layer of the electrical discharge machining electrode wire 10.

The core 1 is formed of copper or a copper alloy. The copper alloy is not specifically limited but is preferably brass.

The zinc-containing covering layer 2 provided around the core 1 is formed by applying a zinc plating or a zinc alloy plating. The zinc plating is preferable.

The covering layer 2 has at least the outermost layer 2B which is formed of only an ε-phase copper-zinc alloy. The ε-phase is a Cu—Zn alloy generally expressed by $CuZn_5$ and having a Cu concentration of about 12 to 24 mass % and a Zn concentration of about 76 to 88 mass %. The ε-phase is not in the form of islands but is formed as a layer covering the entire circumferential surface of the core.

The electrical discharge machining electrode wire 10 in the embodiment of the invention is provided with the outermost layer 2B which consists of only an ε-phase and has a Cu concentration of 12 to 20 mass % such that the Cu concentration in a longitudinal direction of the electrode wire has a variation range within 5 mass %. The Cu concentration in the outermost layer 2B is preferably 14 to 20 mass %, more preferably 15 to 19 mass %. In the outermost layer 2B, the variation range of the Cu concentration in the longitudinal direction of the electrode wire is preferably within 4 mass %, more preferably within 3 mass %. For example, the Cu concentration in a region of about 1 μm from the outermost surface is measured using SEM-EDX (a scanning electron microscope with an energy dispersive X-ray analyzer).

The variation range of the Cu concentration in the longitudinal direction of the electrode wire is a difference in Cu concentration (=the maximum value of Cu concentration— the minimum value of Cu concentration) when measuring the Cu concentration at certain intervals from an end portion of the electrode wire in the longitudinal direction. The certain interval is not specifically limited but is preferably, e.g., every 10 to 15 kg from the end portion when measuring on not less than 200 kg of the electrode wire. In case of less than 200 kg of electrode wire, it is preferable to measure at every 1 to 25 kg from the end portion. The variation range is desirably measured per bobbin heat-treated as described later. When the electrode wire on one bobbin after heat treatment is cut into several pieces and then shipped, the variation range is different for each piece of the electrode wire depending on the cut length but is generally smaller than the variation range obtained by measuring per bobbin. For example, when 300 kg of the electrode wire wound around a bobbin is heat-treated and is then cut into smaller portions of about 20 to 50 kg, the variation range of the Cu concentration in the longitudinal direction of each divided electrode wire is preferably within 4 mass %, more preferably within 3 mass %, and further preferably within 2 mass %. In this regard, any Cu concentration which is in the above-mentioned range and has a variation range within 5 mass % falls within the scope of invention. In general, electrode wires are sold in not less than 5 kg. Thus, the variation range in the present embodiment means a variation range of Cu concentration in the longitudinal direction of not less than 5 kg of electrode wire.

The covering layer 2 may have another layer containing zinc and located on the inner side of the outermost layer 2B, and preferably has, e.g., an inner layer 2A containing a γ-phase copper-zinc alloy. The γ-phase is a Cu—Zn alloy generally expressed by $Cu_5Zn_8$ and having a Cu concentration of about 45 to 35 mass % and a Zn concentration of about 55 to 65 mass %. As for the inner layer 2A containing the γ-phase, the amount of the γ-phase contained in the inner layer is preferably not less than 85 mass %, more preferably not less than 90 mass %, further preferably not less than 95 mass %, and most preferably 100 mass %.

The inner layer 2A constituting the covering layer 2 may be composed of two or more layers. A layer formed of a β-phase copper-zinc alloy and a layer formed of a η-phase pure zinc are preferably absent but may be present as long as the effects of the invention are exerted.

The covering layer 2 is preferably formed so that the x-ray diffraction intensity of (0001) of the ε-phase in the covering layer 2 is more than twice the x-ray diffraction intensity of (332) of the γ-phase in the covering layer 2. In the present embodiment, all or most of the ε-phase in the covering layer 2 is present in the outermost layer 2B, and all of the γ-phase in the covering layer 2 is present in the inner layer 2A. The x-ray diffraction intensity of (0001) of the ε-phase is preferably not less than 3 times, more preferably, not less than 4 times the x-ray diffraction intensity of (332) of the γ-phase. There is no specific upper limit but not more than 20 times is preferable. The x-ray diffraction intensities used for comparison are the peak intensities measured by a thin-film method (a method in which an incident x-ray beam is fixed at a small angle (e.g., 10°) to reduce an incident depth of X-ray beam to the extent that the x-ray beam is slightly incident on the core, thereby increasing sensitivity to analyze the surface layer).

The thickness of the covering layer 2 as a whole is preferably 1 to 20 μm. When the inner layer 2A is provided, the layer thickness ratio is preferably the outermost layer 2B/the inner layer 2A=4/1 to 1/1.

[Method of Manufacturing Electrical Discharge Machining Electrode Wire]

A manufacturing method in the embodiment of the invention is to manufacture the electrical discharge machining electrode wire 10 formed by covering the core 1 comprising copper or a copper alloy with the zinc-containing covering layer 2, and the method includes a step of plating the core 1 with zinc or a zinc alloy once, a step of drawing the plated core 1, and a step of performing post-wire-drawing heat treatment with the heat treatment conditions adjusted so that the covering layer 2 has the outermost layer 2B consisting of only an ε-phase copper-zinc alloy and the outermost layer 2B has a Cu concentration of 12 to 20 mass % such that the Cu concentration in a longitudinal direction of the electrode wire has a variation range within 5 mass %. Hereinafter, heat treatment is sometimes referred to as annealing.

The step of plating with zinc or a zinc alloy once and the wire drawing step can be performed by known methods.

The above-described electrical discharge machining electrode wire 10 in the embodiment of the invention can be obtained through the step of performing post-wire-drawing heat treatment. The heat treatment conditions are adjusted so that the outermost layer 2B described above can be formed preferably in the range of 100 to 120° C. and 3 to 24 hours, more preferably, 100 to 120° C. and 3 to 18 hours. The temperature and time of heat treatment are appropriately adjusted depending on the diameter of the electrode wire and the thickness of the covering layer. The heat treatment at, e.g., 100° C. is performed preferably for about 6 to 10 hours when the electrode wire has a diameter of Φ0.02 mm, and preferably for about 10 to 17 hours when the electrode wire has a diameter of Φ0.25 mm Meanwhile, the heat treatment at, e.g., 100° C. is performed preferably for about 3 to 7 hours when the covering layer has a thickness of less than 1.5 μm, and preferably for about 7 to 18 hours when the covering layer has a thickness of not less than 1.5 μm.

According to the manufacturing method in the embodiment of the invention, the inner layer 2A constituting the covering layer 2 can be simultaneously formed in the above-described heat treatment step. By appropriately adjusting the heat treatment conditions, a covering layer can be formed so that the x-ray diffraction intensity of (0001) of the ε-phase in the covering layer 2 is more than twice the x-ray diffraction intensity of (332) of the γ-phase in the covering layer 2.

Effects of the Embodiment of the Invention

The following effects are obtained in the embodiment of the invention.

(1) It is possible to provide an electrical discharge machining electrode wire having a zinc coating around a core and formed so that variation in Cu concentration in an outermost surface layer is small, and also to provide a method of manufacturing such an electrical discharge machining electrode wire.

(2) The plating step is performed only once during manufacturing. Therefore, it is possible to provide an electrical discharge machining electrode wire with excellent productivity and a method of manufacturing the same.

Next, the invention will be described in reference to Example. However, the invention is not limited to Example.

EXAMPLE

[Manufacturing of Electrical Discharge Machining Electrode Wire]

Using a zinc electroplating method, a zinc plating layer having a thickness of about 10 μm was formed on a brass wire (diameter: 1.2 mm) as the core 1. The core 1 plated with zinc was drawn to a diameter of 0.20 mm (to 1.7 μm of the plating layer), was then wound onto a bobbin (F350: spindle diameter of 340 mm), and was annealed (heat-treated) in this state, thereby making 300 kg each of electrical discharge machining electrode wires. The annealing (heat treatment) conditions were 100° C. for 8 hours in Example and 160° C. for 3 hours in Comparative Example.

Figure 2:
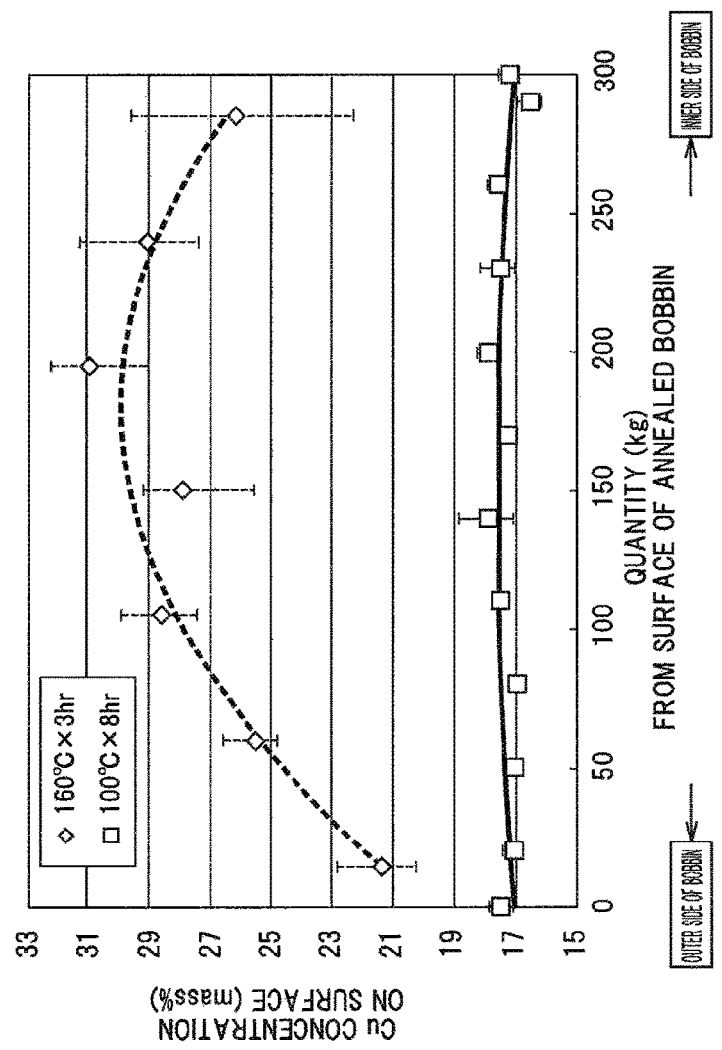
FIG. 2 is a graph showing the results of measuring the Cu concentration in outermost surface layers of electrical discharge machining electrode wires in Example and Comparative Example.

Using SEM-EDX (a scanning electron microscope with an energy dispersive X-ray analyzer), EDX analysis was conducted on a region of about 1 μm from the outermost surface of each obtained electrical discharge machining electrode wire at an accelerating voltage of 15 kV, thereby measuring the Cu concentration in each electrode wire. FIG. 2 is a graph showing the results of measuring the Cu concentration in outermost surface layers of electrical discharge machining electrode wires in Example and Comparative Example. The Cu concentration was measured at intervals of about 25 kg from the end portion in Example and at intervals of about 50 kg from the end portion in Comparative Example. The Cu concentration in the longitudinal direction of the electrode wire in Example had a variation range of 2.7 mass %, and the Cu concentration in the longitudinal direction of the electrode wire in Comparative Example had a variation range of 12 mass %.

Meanwhile, as a result of assessing the phase state of the covering layer (the outermost layer and the inner layer) by performing SEM observation and analysis on the polished cross section of the electrode wire sample, it was confirmed that the outermost layer consisting of only the ε-phase and the inner layer containing the γ-phase were formed in Example.

[Measurement and Examination of X-ray Diffraction Intensity]

Figure 3A:
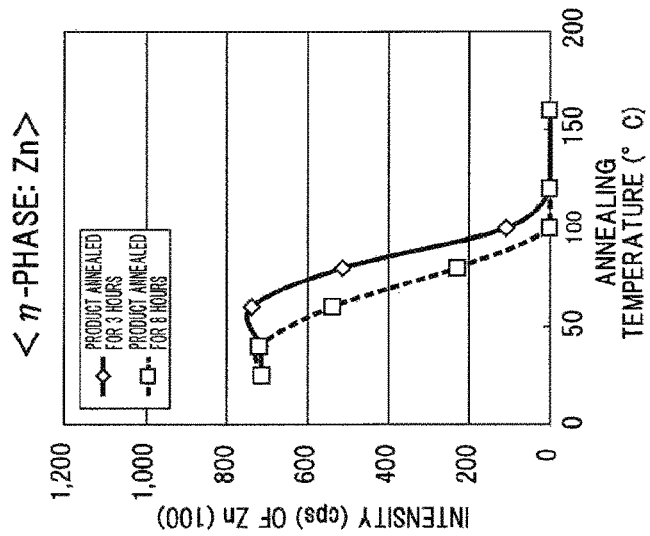
FIG. 3A is a graph showing intensity of (0001) of the ε-phase ($CuZn_5$) which is obtained by x-ray diffraction intensity measurement on electrical discharge machining electrode wires (core diameter: 0.20 mm) made at different annealing times and annealing temperatures.
Figure 3B:
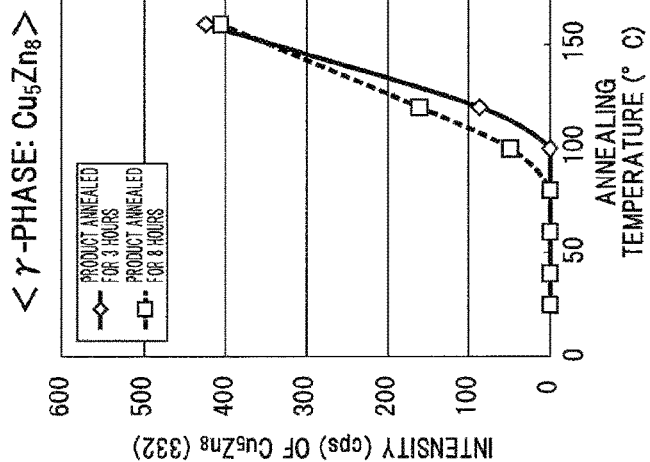
FIG. 3B is a graph showing intensity of (332) of the γ-phase ($Cu_5Zn_8$) which is obtained by x-ray diffraction intensity measurement on the electrical discharge machining electrode wires (core diameter: 0.20 mm) made at different annealing times and annealing temperatures.
Figure 3C:
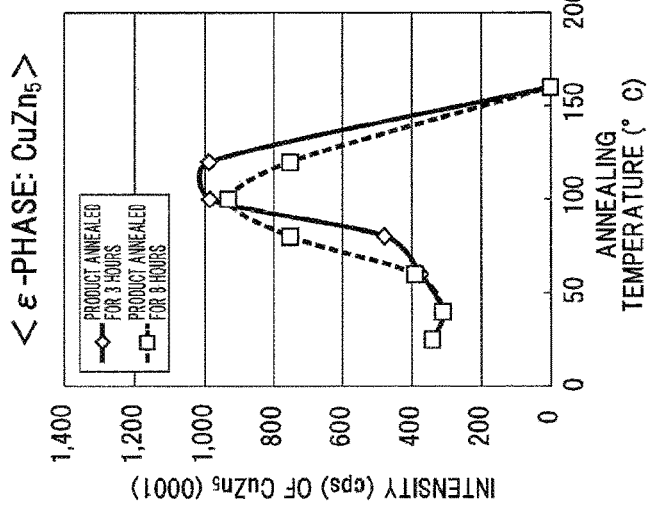
FIG. 3C is a graph showing intensity of (100) of the η-phase (Zn) which is obtained by x-ray diffraction intensity measurement on the electrical discharge machining electrode wires (core diameter: 0.20 mm) made at different annealing times and annealing temperatures.

Electrical discharge machining electrode wires were made by the following method and were subjected to x-ray diffraction intensity measurement using the previously described thin-film method (X-ray incident angle: 10°). FIGS. 3A to 3C show the results of x-ray diffraction intensity measured on the electrical discharge machining electrode wires (core diameter: 0.20 mm) made at different annealing times and annealing temperatures, wherein FIG. 3A is the result of measuring intensity of (0001) of the ε-phase (CuZn$_5$) in the covering layer, FIG. 3B is the result of measuring intensity of (332) of the γ-phase (Cu$_5$Zn$_8$) in the covering layer and FIG. 3C is the result of measuring intensity of (100) of the η-phase (Zn) in the covering layer. In FIGS. 3A to 3C, a plot at 25° C. is the measurement result of a non-annealed electrical discharge machining electrode wire.

Using a zinc electroplating method, a zinc plating layer having a thickness of about 10 μm was formed on a brass wire (diameter: 1.2 mm) as the core 1. The core 1 plated with zinc was drawn to a diameter of 0.20 mm (to 1.7 μm of the plating layer), was then wound onto a bobbin (F10: spindle diameter of 100 mm), and was annealed in this state, thereby making 10 kg each of electrical discharge machining electrode wires. The annealing conditions were 40 to 160° C. (40, 60, 80, 100, 120 or 160° C.) for 3 hours or for 8 hours.

It is understood from FIGS. 3A and 3B that, at the annealing temperature of not more than 120° C., the x-ray diffraction intensity of (0001) of the ε-phase is more than twice the x-ray diffraction intensity of (332) of the γ-phase when annealing time was 3 hours and also 8 hours. Meanwhile, an x-ray diffraction intensity of (100) of the η phase (Zn) was 0 when annealed at a temperature of 100° C. or more for 8 hours and when annealed at a temperature of 120° C. or more for 3 hours (FIG. 3C). The η-phase is a pure Zn phase and is likely to produce abrasion powder due to its softness, which accumulates as debris on a pass line of an electrical discharge machine. Therefore, the η-phase is preferably eliminated by heat treatment, and it is understood that this requires heat treatment at not less than 100° C.

Based on the measurement results x-ray diffraction intensity, heat treatment at 100° C. to 120° C. is optimal.

The invention is not intended to be limited to the embodiment and Example, and the various kinds of modifications can be implemented.

REFERENCE SIGNS LIST

1 Core
2 Covering Layer
2A Inner Layer
2B Outermost Layer (ε-Phase)
10 Electrode Wire

The invention claimed is:

1. An electrical discharge machining electrode wire, comprising:
   a core comprising a copper or a copper alloy; and
   a covering layer that covers a periphery of the core,
   wherein the covering layer is consisted of an inner layer consisting of a γ-phase of copper and zinc provided on the core and an outermost layer consisting of an ε-phase of copper and zinc provided on the inner layer,
   wherein the inner layer has a Cu concentration of 35 mass % to 45 mass %, and
   wherein the outermost layer has a Cu concentration of 12 mass % to 20 mass % and a variation range within 5 mass % in the Cu concentration in a longitudinal direction of the electrode wire.

2. The electrical discharge machining electrode wire according to claim 1, wherein an x-ray diffraction intensity of (0001) of the ε-phase in the covering layer is more than twice an x-ray diffraction intensity of (332) of the γ-phase in the covering layer.

3. The electrical discharge machining electrode wire according to claim 1, wherein the core comprises a brass.

4. The electrical discharge machining electrode wire according to claim 1, wherein the inner layer is disposed on an outer surface of the core.

5. The electrical discharge machining electrode wire according to claim 1, wherein the outermost layer is disposed on an outer surface of the inner layer.

6. The electrical discharge machining electrode wire according to claim 1, wherein the inner layer, as a single layer, extends from an outer surface of the core to an inner surface of the outermost layer.

7. The electrical discharge machining electrode wire according to claim 1, wherein the inner layer abuts the core.

8. The electrical discharge machining electrode wire according to claim 7, wherein the outermost layer abuts the inner layer.

9. The electrical discharge machining electrode wire according to claim 1, wherein, in the electrical discharge machining electrode wire, the outermost layer is formed in a heat treatment in a range from 100° C. to 120° C.

10. The electrical discharge machining electrode wire according to claim 1, wherein the outermost layer has the Cu concentration in a range from 14 mass % to 20 mass %.

11. The electrical discharge machining electrode wire according to claim 1, wherein the outermost layer has the Cu concentration in a range from 15 mass % to 19 mass %.

12. The electrical discharge machining electrode wire according to claim 1, wherein the outermost layer has the variation range within 4 mass % in the Cu concentration in the longitudinal direction of the electrode wire.

13. The electrical discharge machining electrode wire according to claim 1, wherein the outermost layer has the variation range within 3 mass % in the Cu concentration in the longitudinal direction of the electrode wire.

14. The electrical discharge machining electrode wire according to claim 1, wherein the γ-phase in the inner layer has a Zn concentration of 55 mass % to 65 mass %.

15. The electrical discharge machining electrode wire according to claim 1, wherein the electrical discharge machining electrode wire is produced by a zinc electroplating in which a zinc plating layer is formed on a brass wire as the core and the core plated with zinc is drawn, wound onto a bobbin, and annealed in a predetermined temperature.

16. The electrical discharge machining electrode wire according to claim 15, wherein the predetermined temperature is in a range from 100° C. to 120° C.

17. An electrical discharge machining electrode wire, comprising:
   a core comprising a copper or a copper alloy; and
   a covering layer that covers a periphery of the core,
   wherein the covering layer is consisted of an inner layer consisting of a γ-phase of copper and zinc provided on the core and an outermost layer consisting of an ε-phase of copper and zinc provided on the inner layer,
   wherein the inner layer has a Cu concentration of 35 mass % to 45 mass %,
   wherein the outermost layer has a Cu concentration of 12 mass % to 20 mass % and a variation range within 5 mass % in the Cu concentration in a longitudinal direction of the electrode wire, and
   wherein the ε-phase is expressed by $CuZn_5$ and the γ-phase is expressed by $Cu_5Zn_8$.

* * * * *